US012442393B2

(12) United States Patent
Johansen et al.

(10) Patent No.: US 12,442,393 B2
(45) Date of Patent: Oct. 14, 2025

(54) HYDRAULIC DEVICE

(71) Applicant: AALBORG UNIVERSITET, Aalborg Øst (DK)

(72) Inventors: Per Johansen, Tjele (DK); Anders Hedegaard Hansen, Vestbjerg (DK)

(73) Assignee: AALBORG UNIVERSITET, Aalborg Øst (DK)

( * ) Notice: Subject to any disclaimer, the term of this patent is extended or adjusted under 35 U.S.C. 154(b) by 0 days.

(21) Appl. No.: 18/713,528

(22) PCT Filed: Nov. 28, 2022

(86) PCT No.: PCT/DK2022/050249
§ 371 (c)(1),
(2) Date: May 24, 2024

(87) PCT Pub. No.: WO2023/093961
PCT Pub. Date: Jun. 1, 2023

(65) Prior Publication Data
US 2025/0027514 A1 Jan. 23, 2025

(30) Foreign Application Priority Data
Nov. 29, 2021 (DK) ........................... PA 2021 70588

(51) Int. Cl.
*F15B 11/02* (2006.01)
*F15B 11/028* (2006.01)

(52) U.S. Cl.
CPC ... *F15B 11/028* (2013.01); *F15B 2211/30565* (2013.01); *F15B 2211/6336* (2013.01); *F15B 2211/77* (2013.01)

(58) Field of Classification Search
CPC .... F15B 2211/30565; F15B 2211/6336; F15B 11/028
See application file for complete search history.

(56) References Cited

U.S. PATENT DOCUMENTS 4,319,609 A 3/1982 Debrus
5,218,997 A 6/1993 Dunwoody
(Continued)

FOREIGN PATENT DOCUMENTS

EP 2546530 A2 1/2013
EP 2829730 A1 1/2015
(Continued)

OTHER PUBLICATIONS

Heybroek, K. et al., "Towards Resistance-free Hydraulics in Construction Machinery," In 8th International Fluid Power Conference, Dresden, Mar. 26-28, 2012 (vol. 2, pp. 123-138). Dresdner Verein zur Förderung der Fluidtechnik.
(Continued)

*Primary Examiner* — Abiy Teka
(74) *Attorney, Agent, or Firm* — J. Peter Paredes; Amin Wasserman Gurnani LLP

(57) ABSTRACT

The present invention relates inter alia to a hydraulic device which may be used as a hydraulic transformer. The hydraulic device comprising a housing, a first tubular cavity and a second tubular cavity both being provided within the housing. A piston structure is reciprocatable arranged within the housing and comprises a first piston and a second piston; wherein the first piston divides the first cavity into two chambers, and the second piston divides the second cavity into two chambers. Fluid passages for individually exchanging fluid between the chambers and the exterior of the housing are provided and each fluid passage comprising a controllable shut-off valve so as to provide the reciprocating movement of the piston structure by exchanging fluid between exterior and the two chambers of the first cavity, and said hydraulic transformed being configured to control the shut-off valves to selectively be in a closed state or in an open state.

19 Claims, 9 Drawing Sheets

(56) References Cited

U.S. PATENT DOCUMENTS

| | | | | |
|---|---|---|---|---|
| 6,003,429 | A * | 12/1999 | Nakabayashi | B30B 1/323 91/509 |
| 2007/0120662 | A1* | 5/2007 | Bishop | F15B 21/087 340/500 |
| 2013/0006194 | A1 | 1/2013 | Anderson et al. | |
| 2013/0061946 | A1 | 3/2013 | Bishop | |
| 2016/0061229 | A1 | 3/2016 | Lind et al. | |
| 2019/0010967 | A1 | 1/2019 | Ueda et al. | |

FOREIGN PATENT DOCUMENTS

| | | | | |
|---|---|---|---|---|
| EP | 2829730 | B1 * | 4/2018 | E02F 9/2217 |
| WO | 2015025094 | A1 | 2/2015 | |

OTHER PUBLICATIONS

Payne, G. S., et al. "Efficiency and dynamic performance of Digital Displacement™ hydraulic transmission in tidal current energy converters." Proceedings of the Institution of Mechanical Engineers, Part A: Journal of Power and Energy 221.2 (2007): 207-218.

Ketelsen, S. et al., "Classification and Review of Pump-Controlled Differential Cylinder Drives," Energies, vol. 12, No. 7, p. 1293, Apr. 2019, 27 pages.

Yuan, C. et al., "A review of switched inertance hydraulic converter technology," in BATH/ASME 2018 Symposium on Fluid Power and Motion Control, FPMC 2018, 2018, 13 pages.

Ehsan, M. et al., "Modeling of Digital-Displacement Pump/Motors and Their Application as Hydraulic Drives for Nonuniform Loads," J. Dyn. Syst. Meas. Control, vol. 122, No. 1, pp. 210-215, 2000.

Linjama, M., "Model-Based Control of a Digital Hydraulic Transformer-Based Hybrid Actuator," 2018, In Fluid Power Systems Technology (vol. 51968, p. V001T01A033). American Society of Mechanical Engineers, 10 pages.

WIPO/ISA/EPO, International Search Report and Written Opinion issued in corresponding application PCT/DK2022/050249 dated Jan. 31, 2023, 14 pages.

* cited by examiner

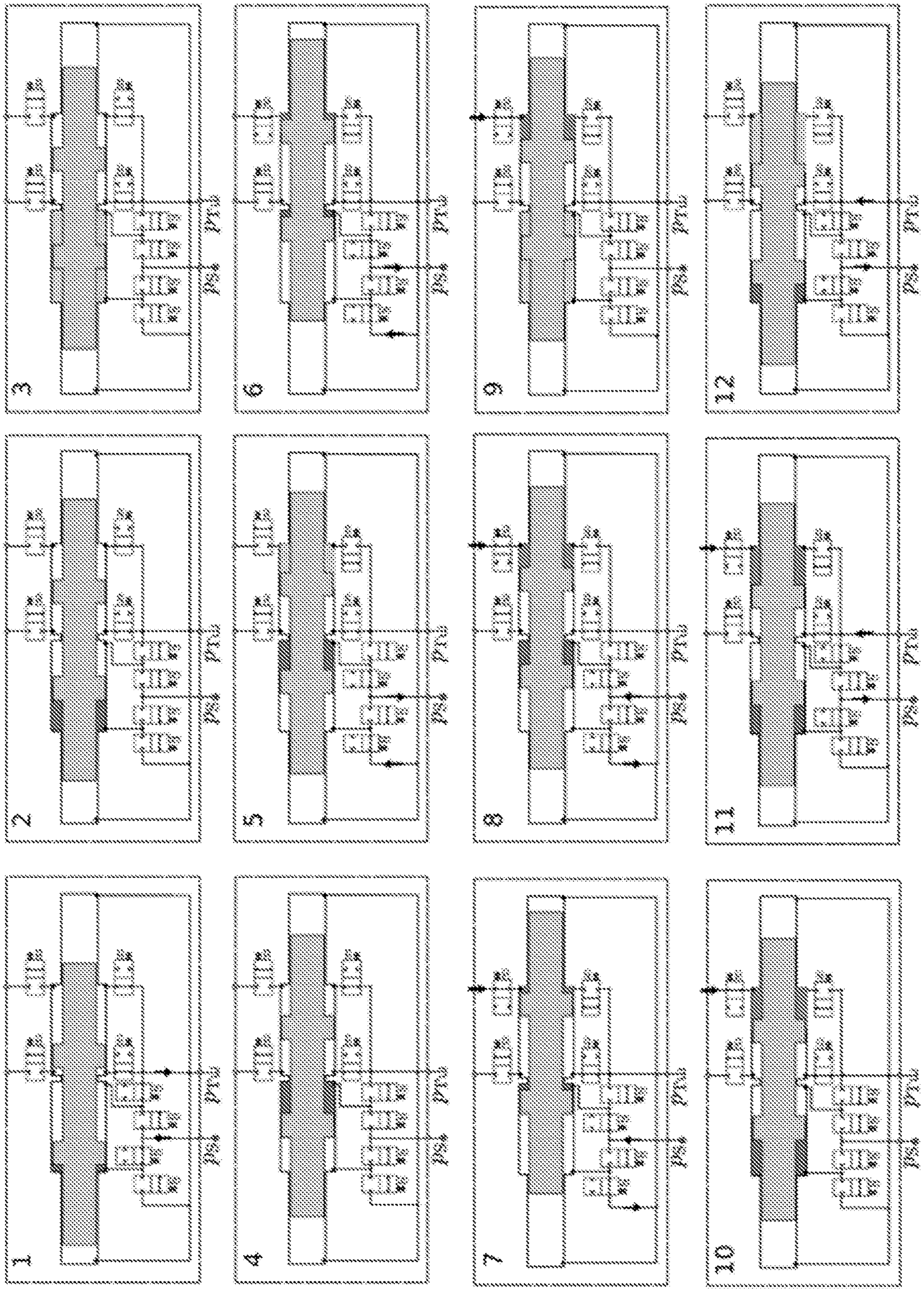
Fig. 1C – Continues at next page

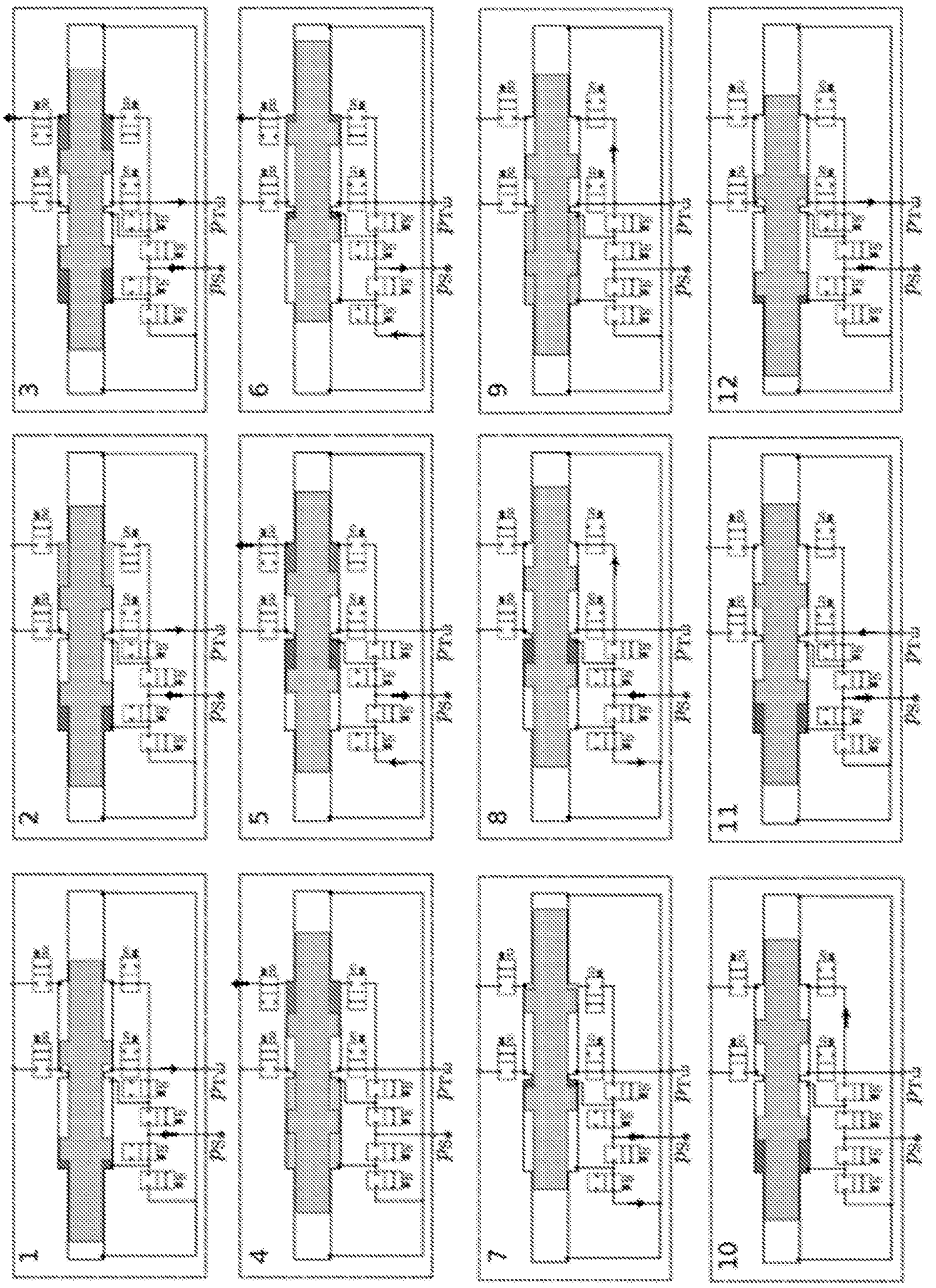
Fig. 1D – Continues on next page

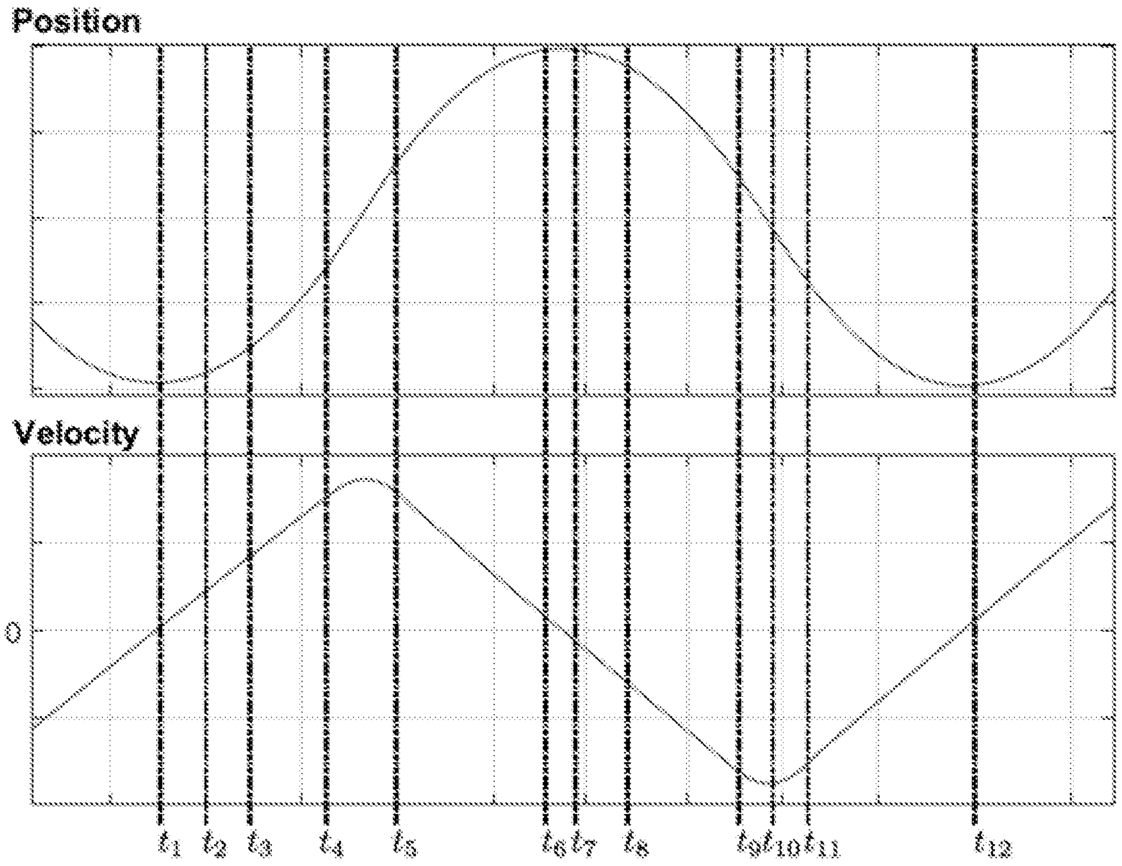
Fig. 1D - Continued

HYDRAULIC DEVICE

CROSS-REFERENCE TO RELATED APPLICATIONS

The present application claims priority to PCT application serial no. PCT/DK2022/050249, filed Nov. 28, 2022, which claims priority to Danish patent application serial no. PA 2021 70588, filed Nov. 29, 2021, each herein incorporated by reference in their entireties.

FIELD OF THE INVENTION

The present invention relates inter alia to a hydraulic device which may be used as a hydraulic transformer. The hydraulic device comprising a housing, a first tubular cavity and a second tubular cavity both being provided within the housing.

A piston structure is reciprocatable arranged within the housing and comprises a first piston and a second piston; wherein the first piston divides the first cavity into two chambers, and the second piston divides the second cavity into two chambers. Fluid passages for individually exchanging fluid between the chambers and the exterior of the housing are provided and each fluid passage comprising a controllable shut-off valve so as to provide the reciprocating movement of the piston structure by exchanging fluid between exterior and the two chambers of the first cavity, and said hydraulic transformed being configured to control the shut-off valves to selectively be in a closed state or in an open state.

BACKGROUND OF THE INVENTION

A priority in hydraulic system research and development is most often to increase the efficiency of hydraulic systems used in main energy consuming sectors such as a agriculture, manufacturing and construction. The low efficiency of the system mainly originates from the use of proportional valves, and the resistive control they entail.

In some situation, a general technical problem is to deliver a flow from a common pressure rail to connected cylinders at their individual pressure levels. However, conventional throttling is used to control the pressure at which the flow of fluid is delivered, which may be said to be equivalent to controlling the speed of a car with the brakes while the engine is at full power. Ideally, the transformation of power from the common rail should be loss free where the input power and the output power are equal ($P_{in}=p_{in}*Q_{in}=P_{out}=p_{out}*Q_{out}$, where P is power, p is pressure and Q volume flow)

OBJECT OF THE INVENTION

In particular, it may be seen as an object of the present invention to provide a method and device that solves or at least mitigates the above mentioned problems of the prior art, e.g. with respect to with transformation losses.

It is a further object of the present invention to provide an alternative to the prior art.

SUMMARY OF THE INVENTION

Thus, the above described object and several other objects are intended to be obtained in a first aspect of the invention by providing a hydraulic device comprising: a housing, a first tubular cavity and a second tubular cavity provided within the housing and a reciprocatable arranged piston structure, the piston structure comprising a first piston and a second piston.

The first piston divides the first cavity into two chambers, and the second piston divides the second cavity into two chambers.

Fluid passages for individually exchanging fluid between the chambers and the exterior of the housing, where each fluid passage comprising a controllable shut-off valve, so as to provide the reciprocating movement of the piston structure by exchanging fluid between exterior and the two chambers of the first cavity.

The hydraulic transformer being configured to control the shut-off valves to selectively be in a closed state or in an open state.

Terms used herein are used in a manner being ordinary to a skilled person. Some the terms used are detailed here below.

"Equivalent radius" is defined for non-circular shaped as:

$$r = \sqrt{\frac{A}{\pi}} \text{ where } A \text{ is the cross sectional area}$$

"Fit snugly" as used herein is preferably used to mean that two elements are machined relatively to each other with a clearance aiming at reducing fluid leakage through the clearance while still allowing the two elements to move relatively to each other.

BRIEF DESCRIPTION OF THE FIGURES

The present invention and in particular preferred embodiments thereof will now be described in more details with regard to the accompanying figures. The figures show ways of implementing the present invention and are not to be construed as being limiting to other possible embodiments falling within the scope of the attached claim set.

FIGS. 1A-D schematically illustrate a first embodiment according to the invention in combination with different stages in the use. In FIG. 1A a cross sectional view of a hydraulic transformer is disclosed together with valves, in FIG. 1B, different stages in the use of the hydraulic transformer during idling are illustrated, in FIG. 1C different stages in the use of the hydraulic transformer during load supply transformation are illustrated and in FIG. 1D different stages in the use of the hydraulic transform during supply to load are illustrated;

In FIG. 2A a cross sectional view of a hydraulic transformer is disclosed together with valves and in FIG. 2B the piston structure and the housing are illustrated in separate views;

In FIG. 3A a cross sectional view of a hydraulic transformer is disclosed together with valves and in FIG. 3B the piston structure and the housing are illustrated in separate views;

DETAILED DESCRIPTION OF PREFERRED EMBODIMENTS

The following description of preferred embodiments has been made with reference to the hydraulic device being used as a hydraulic transformer, where a hydraulic to hydraulic power transmission is carried out. The invention is not considered to be limited to such use. For instance, the device may also be used as an actuator by arranging a rod or similar item moving with the movement of the piston structure and extending outside the housing.

Figure 1A:
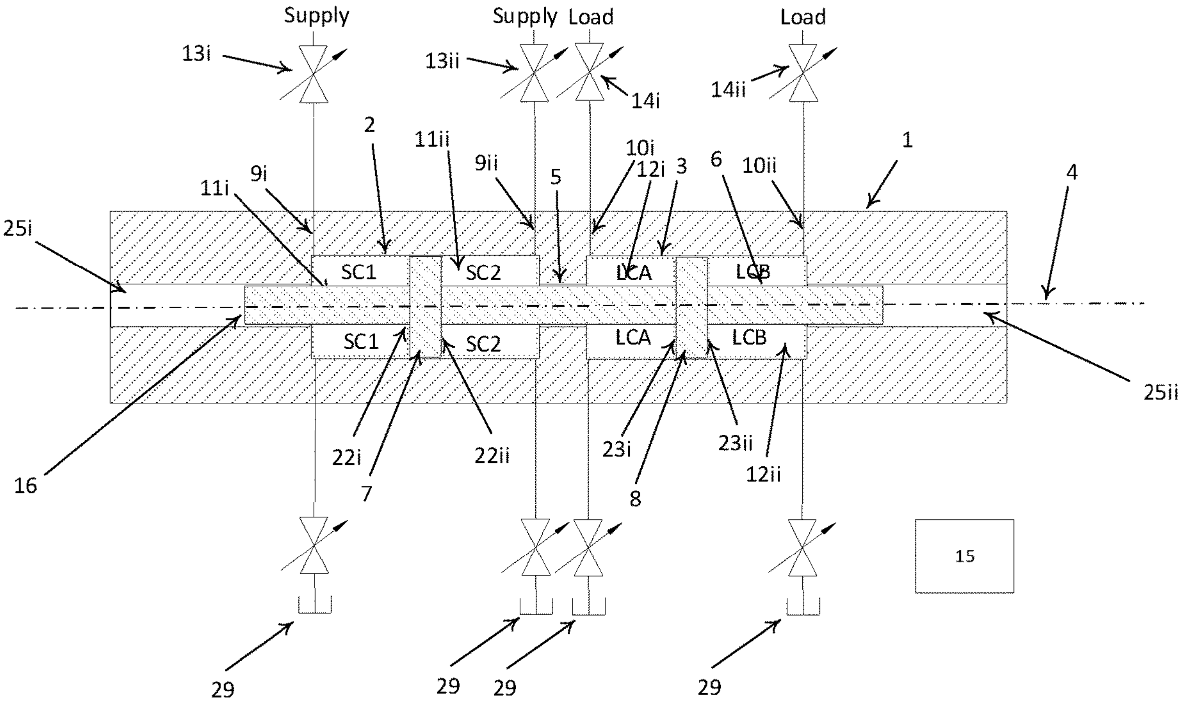

Reference is made to FIG. 1A schematically illustrating in a cross sectional view a first embodiment of hydraulic transformer. The hydraulic transformer has a housing 1 which may be made from metal or another material suitable to withstand the pressure levels the housing will be exposed to.

Inside the housing 1 a first tubular cavity 2 and a second tubular cavity 3 are provided. These cavities are typically cylindrical in shape, but the invention is not limited to such cylindrical shapes. Further, in the illustrated embodiment, the volume of the two cavities 2, 3 are substantially identical but other embodiments of the invention may use cavities with different volumes.

The hydraulic converter also comprises a piston structure 16. This piston structure 16 is reciprocatable arranged within the hydraulic converter. The piston structure in the illustrated embodiment comprises an elongated rod 6 having a first piston 7 and a second piston 8.

The first piston 7 is arranged so that it divides the first cavity into two chambers 11*i*, 11*ii*, and the second piston 8 divides the second cavity into two chambers 12*i*, 12*ii*. By this, each of the piston has opposing surfaces facing a chamber.

Further, the first and second pistons 7, 8 are each dimension relatively to the cavities 2, 3 so as to divide each cavity into two chambers 11*i*, 11*ii*, 12*i*, 12*ii*, one of each side of piston and each with a volume being defined by the longitudinal position of the rod 5. A fluidic seal is provided between the pistons and the wall of the cavities to substantially prevent fluid exchange between chambers on either side of the pistons.

The reciprocating movement of the piston structure is provided by exchanging fluid between the chambers 11, 12 and to accomplish that fluid passages 9*i*, 9*ii*, 10*i*, 10*ii* is provided for individually exchanging fluid between the chambers 11*i*, 11*ii*, 12*i*, 12*ii* and the exterior of the housing 1. By individually is typically meant that a fluid passage only leads to a single chamber. Each of the fluid passages is fluidic connected to a controllable shut-off valve 13*i*, 13*ii*, 14*i*, 14*ii*.

While the valves 13*i*, 13*ii*, 14*i* and 14*ii* as illustrated in the figures are illustrated as single valves, one or more of such valves could each comprise two or more valves arranged in parallel. In such case, one of the valves could be an active valve and the other a passive valve.

The input to the chambers e.g. 11*i* and 11*ii* may be selectively connected to different sources of fluid, such as selectively between a high pressure source and a lower pressure source. Similarly, the output of the chambers 12*i* and 12*ii* may be selectively connected to different devices demanded different loads requirements such a high pressure or a lower pressure or larger and smaller volume flows.

Figure 1B:
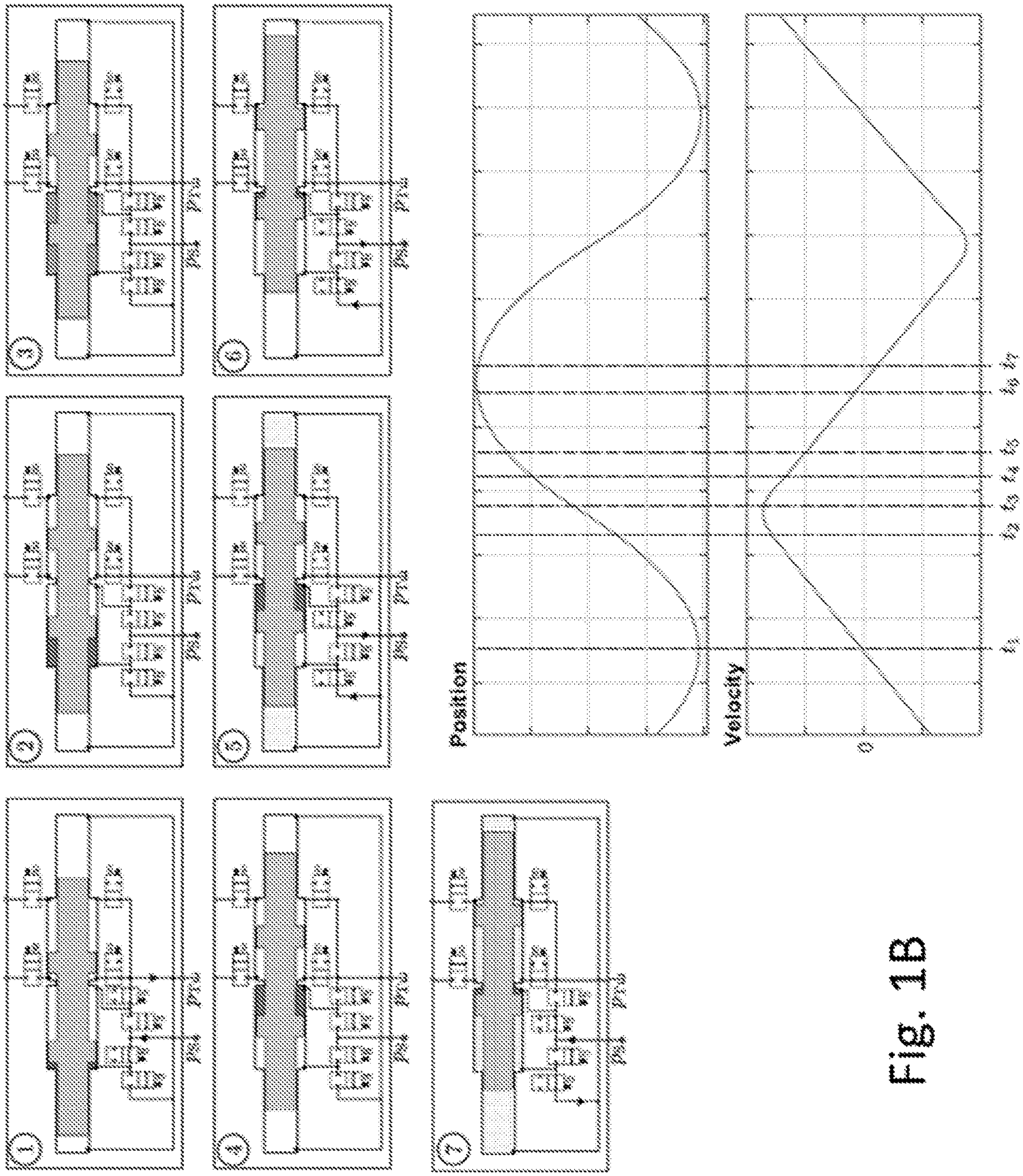

It is to be emphasised that in FIG. 1A two fluid passages for each chamber are illustrated. While such two fluid passages for each chamber is considered within the scope of the invention, a single fluid passage may be used instead as illustrated in FIG. 1B. Kindly observe the implementation difference for the valves in the two FIGS. 1A and 1B.

The valves are connected to either a supply of fluid at an elevated pressure, to a load or to a reservoir 29 holding fluid at a lower pressure than the supply of fluid. Kindly observe that the symbol used to indicate a reservoir is used throughout the figures and reference number 29 has been left out to render the figures more readable. As will be disclosed in connection with FIG. 1B, controlling of the valves provides flow of fluid into and out of the chambers due to the pressure differences between the supply and the reservoir and the valves are controlled so as to provide the reciprocating movement of the piston structure by exchanging fluid between exterior and the two chambers 11*i*, 11*ii* of the first cavity 2.

As also illustrated in FIG. 1A, the fluid passages of the second cavity is selectively connected to a load or a reservoir. By this, the movement of the piston structure 16 provides a flow of fluid either between the chambers 12*i*, 12*ii* and the load or the reservoir.

Controlling of the valves are carried out by use of a processor 15 which configured to control the shut-off valves to selectively be in a closed state or in an open state.

Reference is now made to FIG. 1B. This FIG. 1B is composed by seven cross sectional views with the piston structure 16 in different positions and the valves being in different configuration (open—close). The seven cross sectional view represent snapshots taken during movement of the piston structure from left to right. The graph illustrates a position (upper part of graph) of the piston structure, the velocity of the piston structure (lower part of graph) as function of time. In the graph, $t_1$ corresponds to FIG. 1B-1, $t_2$ corresponds to FIG. 1B-2, $t_3$ corresponds to FIG. 1B-3, 4 corresponds to FIG. 1B-4, $t_5$ corresponds to FIG. 1B-6 and $t_7$ corresponds to 1B-7.

In FIG. 1B, the positioning of the valves is also disclosed. FIG. 1B illustrates what may be labelled an idling process. In the idling process, the chamber 12*i*, 12*ii* (which may be referred to as load-stage chambers) are connected to a reservoir and are thereby inactive. At t=1 the supply pressure is connected to chamber 11*i* and chamber 11*ii* is connected the reservoir. In consequence, the piston structure 16 begins to accelerate at time t=1 as power from the supply line is converted into the kinetic energy of the piston structure 16. At time t=2, the on/off valves of chamber 11*i* and 11*ii* are closed, and the kinetic energy stored in the piston structure 16 entails a continued motion, which makes the chamber pressure equalize due to decompression of chamber 11*i* and compression of chamber 11*ii. At time t*=4 the pressure in chamber 11*i* has dropped to equalize the reservoir and the pressure in chamber 11*ii* has increased to equalize the supply line, whereby the on/off valves can be switched with no pressure difference at t=5. The kinetic energy of the piston structure 16 is now transmitted back to the supply line as the piston decelerates to a stand-still at time t=6. Subsequently, the piston structure 16 begins to accelerate in the opposite direction at t=7 and follows the same procedure in the reverse direction. This process entails an oscillation of the piston which may be referred to as a full-bridge oscillation concept, where energy is oscillating between the supply line and kinetic energy of the piston, without switching losses and only negligible throttling losses.

In the following reference is made to FIGS. 1C and 1D. To avoid potentially rendering the figures unclear due to too many reference numbers, reference is made to FIG. 1A for reference numbers.

Figure 1C:
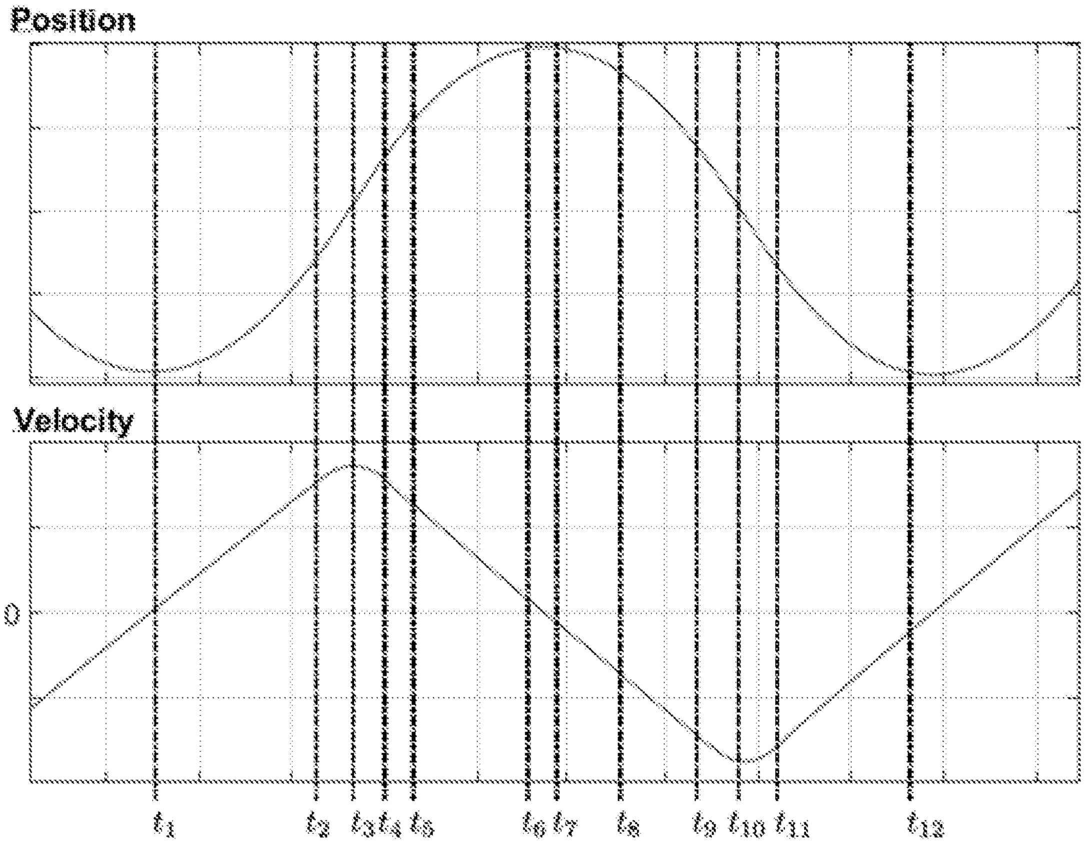

Reference is made to FIG. 1C which illustrated different stages during a load to supply transformation. In FIG. 1C the time t for the position and velocity correspond to the numbering of the figures. In FIG. 1C an operation process for transforming power from a chamber LCB (load port) to a chamber SCN (supply port) SCN is shown, while the other chamber LCA is idling. At t=1 the supply (high pressure) is connected to supply pressure into SC1 and the piston is accelerating. At t=2 both supply chambers SC1 and SC2 are disconnected, and at t=3 a compression and decompression occur in the chambers. At t=4 the other supply chamber, SC2, is pressurized and the piston is now decelerating. At t=5 the load chamber LCB is disconnected and a pressurization occur while the piston further decelerate. At t=6 the load valve of LCB is opened when the load chamber is sufficiently pressurized. At t=7 the piston has come to a standstill and begin accelerating in the opposite direction. At t=8 the piston has travelled a certain distance and at t=9 the supply chambers SC1 and SC2 are again disconnected such that a compression and decompression occur. At t=10 the supply chambers return to the pressure configuration of t=2, and at t=11 the chambers are again connected high pressure supply. At t=12 the load valve is closed and the load chamber decompress, while the piston decelerates and the hydraulic transformer returns to the stage t=1.

Reference is made to FIG. 1D which illustrated different stages during a supply to load transformation. In FIG. 1C the time t for the position and velocity correspond to the numbering of the figures. In FIG. 1D an operation process for transforming power from a supply chamber to a load chamber, LCB, while the other load chamber, LCA idles is shown. At t=1 the supply chamber SC1 is connected to supply pressure and the piston is accelerating. At t=2 a load chamber, LCB, is disconnected from and a compression occur. At t=3 the load chamber, LCB, is pressurized to the level of the load and the load valve is opened. At t=4 the supply chambers, SC1 and SC2, are disconnected source of pressurized fluid and a compression and decompression occur. At t=5 the supply chambers are pressurized (SC2) and depressurized (SC1) and they are again connected to the source of pressurized fluid, and the piston is decelerating to a standstill at t=6, where the piston begin acceleration in the opposite direction. At t=7 the load valve is closed and the load chamber LCB depressurizes. Afterwards the piston go through and idling cycle through t=8→t=12 and the returns to the stage of t=1, where the hydraulic transformer is ready for another pumping stroke towards the load.

Kindly observe that the in FIGS. 1C and 1D, time "t" is a point in time thereby not given as seconds.

As the first and the second cavities serves different purposes, where the first cavity 2 is connected to a supply of pressurised fluid and the second cavity is connected to a load, a pressure difference is typically present between the two cavities. To avoid leakage of fluid between the two cavities, the two cavities are sealed against each other. In the illustrated embodiment of FIG. 1, wherein the piston structure 16 has a portion extending between the two cavities, at least a part of piston structure provides a fluidic seal between the first and the second cavities 2, 3. In the embodiment of FIG. 1, the fluidic seal is provided in between the piston structure 16 and the tubular passage 5. The fluidic seal may be provided by sealing elements such as one or more O-rings and/or piston-rings (not illustrated), by machining the tubular passage 5 and the piston structure 16 mutually to have a sufficient small clearance to allow movement of the piston structure 16 while substantially preventing fluid leakage or combinations thereof.

Division of the two cavities 2, 3 into chambers is preferable provided by the two pistons 7, 8. By this, the first piston 7 and the second piston 8 each comprising two piston heads 22*i*, 22*ii*, 23*i*, 23*ii* facing in opposite directions and into one of said chambers 11*i*, 11*ii*, 12*i*, 12*ii*. In the illustrated embodiments, the piston heads are all shown as being flat but the invention is not limited to such flat piston heads, and the one or more of the piston heads may be curved either concave or convex. The piston heads are typically considered to be the section extending outside the rod 6, and the area of a piston head is typically considered to be the area of the piston head projected onto a plane being perpendicular to the longitudinal direction of the rod 6.

The areas of the piston heads 22*i*, 22*ii* of the first piston 7 are in many embodiments substantially equal and the areas of the piston heads 23*i*, 23*ii* of the second piston (8) are in many embodiments substantially equal. Further, in some embodiments, all piston heads have substantially the same area.

However, piston heads may have different areas. For instance the areas of the piston heads 22*i*, 22*ii* of the first piston 7 may be different from each other and/or the areas of the piston heads 23*i*, 23*ii* of the second piston 8 may be different from each other.

As outlined herein, fluid is to be exchanged between the surroundings and the chambers by use of the fluid connections. In preferred embodiments, those of the fluid connections exchanging fluid with the chambers of the first cavity is connectable to source of pressurized hydraulic fluid and those of said fluid connections exchanging fluid with the chambers of the second cavity is connectable to a hydraulic operated system. [6A] In other embodiments, those of said fluid connections exchanging fluid with the chambers of the second cavity is connectable to source of pressurized hydraulic fluid and those of said fluid connections exchanging fluid with the chambers of the first cavity is connectable to a hydraulic operated system. Connectable is here used to indicated that some kind of valve mechanism is employed providing a fluidic connection when the valve is operated into an open configuration.

Fluid typically flows from a high pressure source and into one of the chambers. The fluid after having moved one of the piston structure 16 typically flows into a reservoir and to provide for such a flow, each of the chambers 11*i*, 11*ii*, 12*i*, 12*ii* is preferably fluidic connectable to a hydraulic fluid reservoir 24.

As perhaps most clearly illustrated in FIG. 1B, the controllable shut-off valves 13*i*, 13*ii*, of the fluid passages for the chambers of the first cavity may comprise two two way valves being selectively connectable to a source of pressurize hydraulic fluid and to a hydraulic fluid reservoir 24 and being selectively shut-off.

Further, and with reference to FIG. 1B, the controllable shut-off valves 14*i*, 14*ii* of the fluid passages for the chambers of the second cavity may each comprise a set of two way valves with one of said two way valves being selectively connectable to hydraulic operated system and being selectively shut-off and the other of said two way valves being selectively connectable to a hydraulic fluid reservoir 24 and being selectively shut-off.

As disclosed herein the piston structure 16 carries out a reciprocating movement and this movement is in many preferred embodiments provided by positioning the shut-off valves 13*i*, 13*ii* 14*i*, 14*ii* in positions allowing fluid to enter into and leave the chambers to provide a pressure difference across a piston driving the piston structure in one of its longitudinal direction. To provide the controlling of the positioning of the shut-off valves, they may electrically actuated so that when energized the valve positions itself in a desired state (shut-off or open).

The time at which a valve is to change state from e.g. shut-off to open (or vice versa) is typically determined by the position of the piston structure 16 relatively to the housing.

Such a position may be determined by the pressure level in a chamber or by determining the position of the piston structure 16 within the housing. In other embodiments, both the pressure and the position are used in input to when a valve is to change state.

In some embodiments, the hydraulic transformer may comprising a position sensor 40, where the position sensor 40 is configured to determining an actual position of the piston structure 16 relatively to the housing during the reciprocating movement and provide the actual position to the controller. Such as sensor may be a conventional magnetic position sensor, a conductive sensor, such as potentiometer sensor, or the like, where a pickup element of the sensor is arranged to pick-up the movement of the piston structure. The controller is configured receive from the position sensor 40, the actual position and to control the state of valves in response to the actual position provided. With reference to FIG. 1B, the position sensor 40 determines the position of the piston structure 16 and in response thereto, the controller effectuated the change in state of the valves into the states illustrated in FIG. 1B.

As an alternative to electrically actuated valves, mechanically actuated valves may be used for one or more, such as all of the shut-off valves. In such embodiments, the hydraulic transformer typically has a camshaft with lobes which actuate the valves. As the reciprocating movement of the piston structure typically has sufficient energy to rotate the camshaft, the camshaft may be mechanically connected through a gear configured to transfer the reciprocating movement into a rotation. Thereby, the movement of the lobes of the camshaft is synchronized with the reciprocating movement of the piston structure 16 so that the change in state of the valves is synchronized with the position of the piston structure 16.

Figure 4:
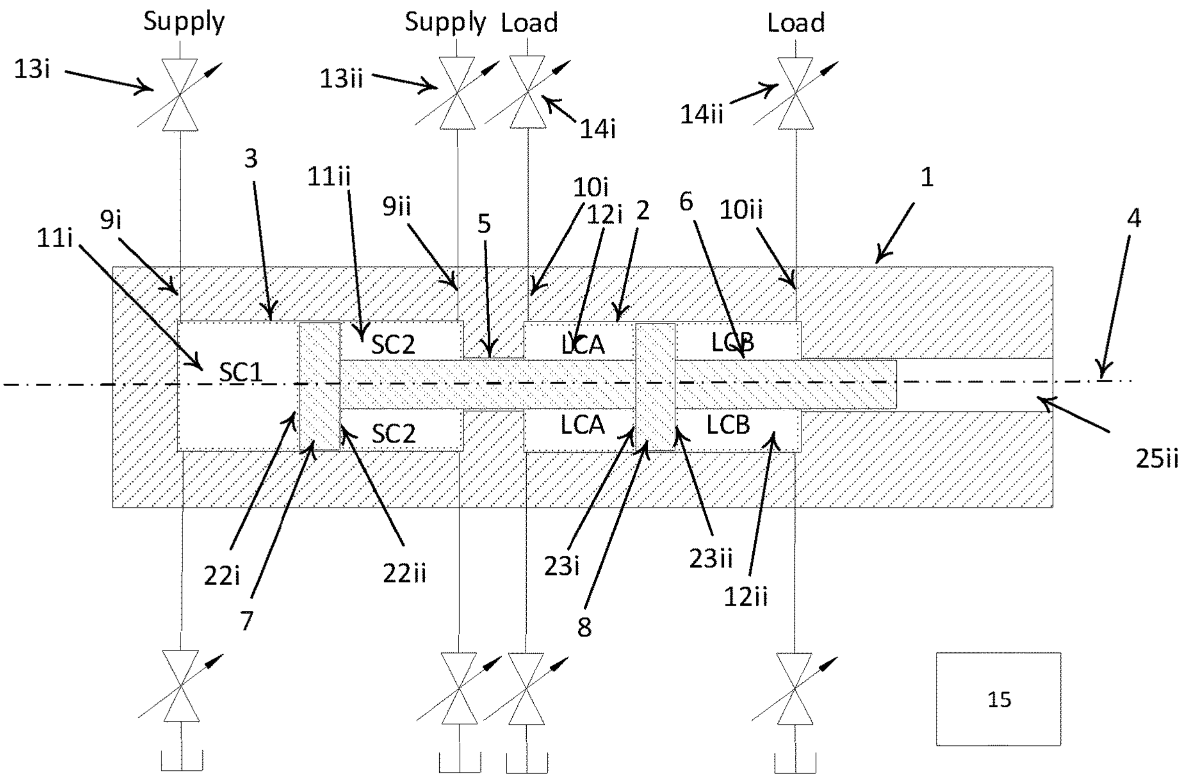
FIG. 4 schematically illustrates in a cross sectional view a fourth embodiment according to the invention.

With reference to FIG. 1 and FIG. 4, the first tubular cavity 2 and the second tubular cavity 3 may be provided within the housing side-by-side on a common axis. A tubular passage 5 is provided and extends between the first tubular cavity 2 and the second tubular cavity 2 and the tubular passage 5 is provided on the common axis 4. As will be apparent from other descriptions presented herein, the invention is not limited to such a configuration.

The piston structure 16 is illustrated as comprising a rod 6 being translatory moveable in a longitudinal direction of the rod and having a radius or equivalent radius being smaller than the radii or equivalent radii of the first and second tubular cavities 2, 3. Thereby, the rod does not take up all the space of the cavities. The rod 6 extends inside the cavities and through the tubular passage 5. As disclosed above, a fluidic seal is provided between the rod 6 tubular passage 5 to substantially prevent fluid from being exchanged between first and the second tubular passages 2, 3.

In the disclosed embodiments, a first piston 7 is provided on the rod 6 in a position where the first piston is within the first cavity 2 and divides the first cavity into said two chambers 11*i*, 11*ii*. A second piston is 8 provided on the rod 6 in a position where the second piston 8 is within the second cavity 3 and divides the second cavity into said two chambers 12*i*, 12*ii*.

It is noted that the first and the second pistons 7,8 in general provides a fluidic seal between the surface of the cavities 2, 3, and the pistons so that fluid is substantially prevented from flowing between neighbouring chambers past a piston. Such a fluidic seal may be provided machining the cavities and the pistons relatively to each other to each to provide a sealing while still allowing for a movement of the pistons, by use of O-rings and/or piston rings or combinations thereof.

A hydraulic transformer according to claim F1, wherein the rod (6) besides extending in between the first and the second pistons furthermore extends beyond the first and the second piston and into a voids (25*i*, 25*ii*), wherein one void arranged at each end of the housing (1) and each of the void (25*i*, 25*ii*) is either fluidic connected to the exterior or to a hydraulic fluid reservoir (24) to avoid substantial pressurization of fluid contained in the void.

Figure 2A:
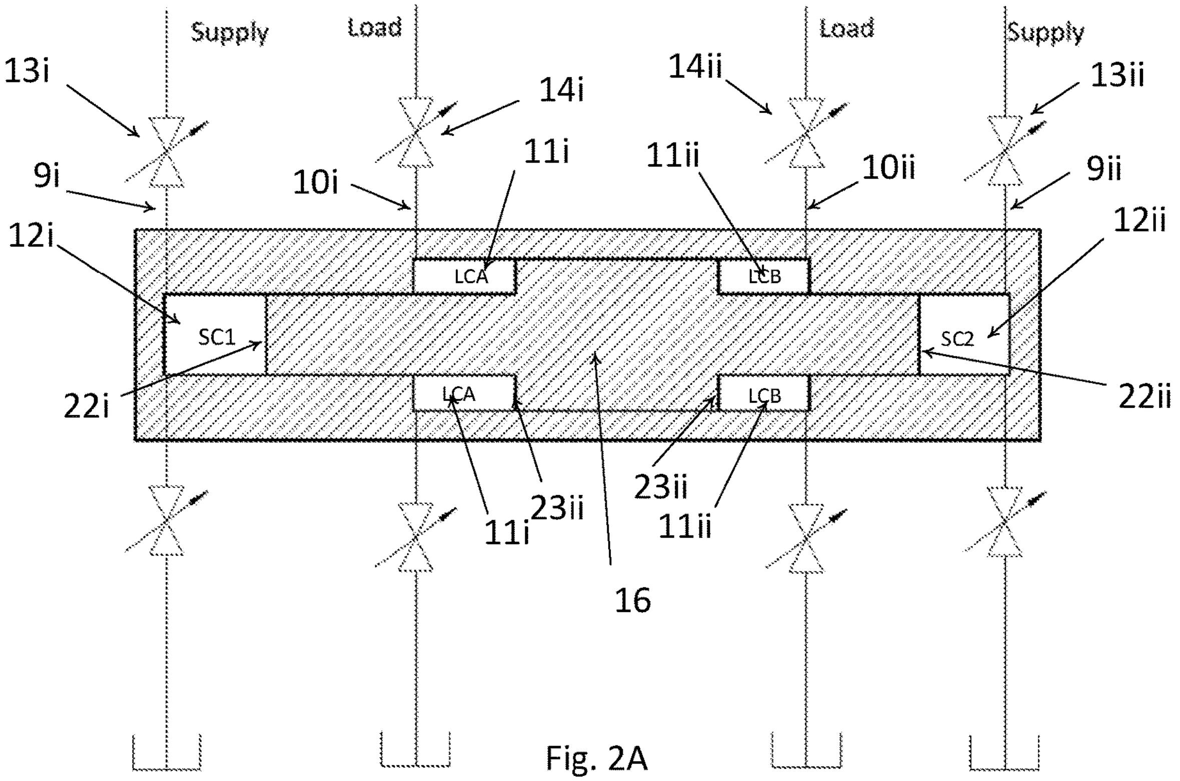
FIGS. 2A-B schematically illustrate a second embodiment according the invention.
Figure 2B:
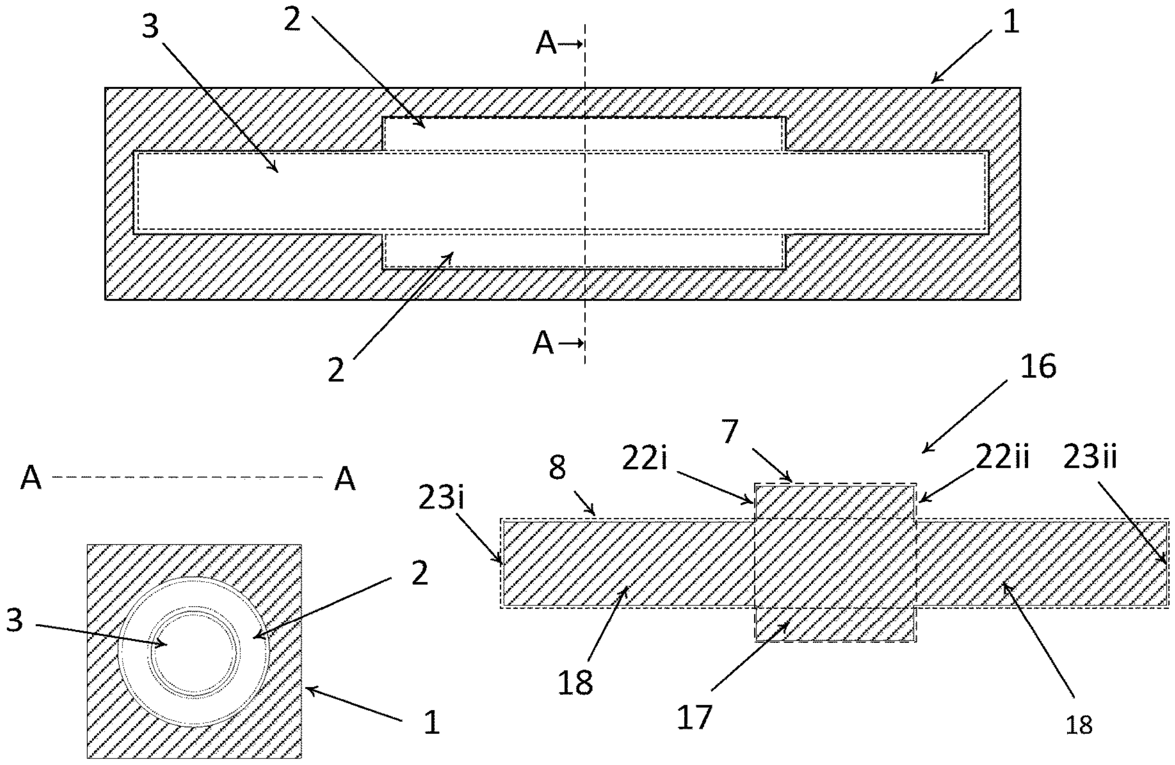

Reference is now made to FIG. 2. As can be realized from the figure the hydraulic transformer has a first cavity 2 and a second cavity 3, The first cavity 2 and the second cavity 3 are perhaps most clearly visible in FIG. 2B. As shown in FIG. 2B the first cavity 2 surrounds the second cavity 3 at a mid-position between the ends of the second cavity 3. It is noted that when the piston structure 16 is removed, as illustrated in FIG. 2B, there exist an interface between the two cavities where there is no physical barrier between the two cavities 2, 3.

As also illustrated, the first cavity 2 has a first diameter and the second cavity 3 has a second diameter. In the disclosed embodiment, the second diameter is smaller than the first diameter. The first and the second cavities are co-axially provided within the housing 1.

The piston structure 16 is illustrated in FIG. 2B lower right corner. The piston structure may be disclosed as comprising a first piston 7 as a first cylindrical section 17 and a second piston as two second cylindrical sections 18 co-axially provided on either end of the first cylindrical section 17. By this, two ring shaped piston heads 22*i*, 22*ii* of the first piston 7 are provided and two circular shaped piston heads 23*i*, 23*ii* of the second piston 8 are provided. To seal the pistons 2,3 against walls of the cavities 2, 3, the first cylindrical section 17 is adapted to fit, preferably snugly, within the first cavity 2 and the two second cylindrical sections 18 are adapted to fit, preferably snugly within the second cavity 3. The other seals disclosed herein may also be applied to the embodiment shown in FIG. 2. Kindly observe that for clarity reasons the fluid passages into the cavities 2, 3 are not shown in FIG. 2B.

Figure 3A:
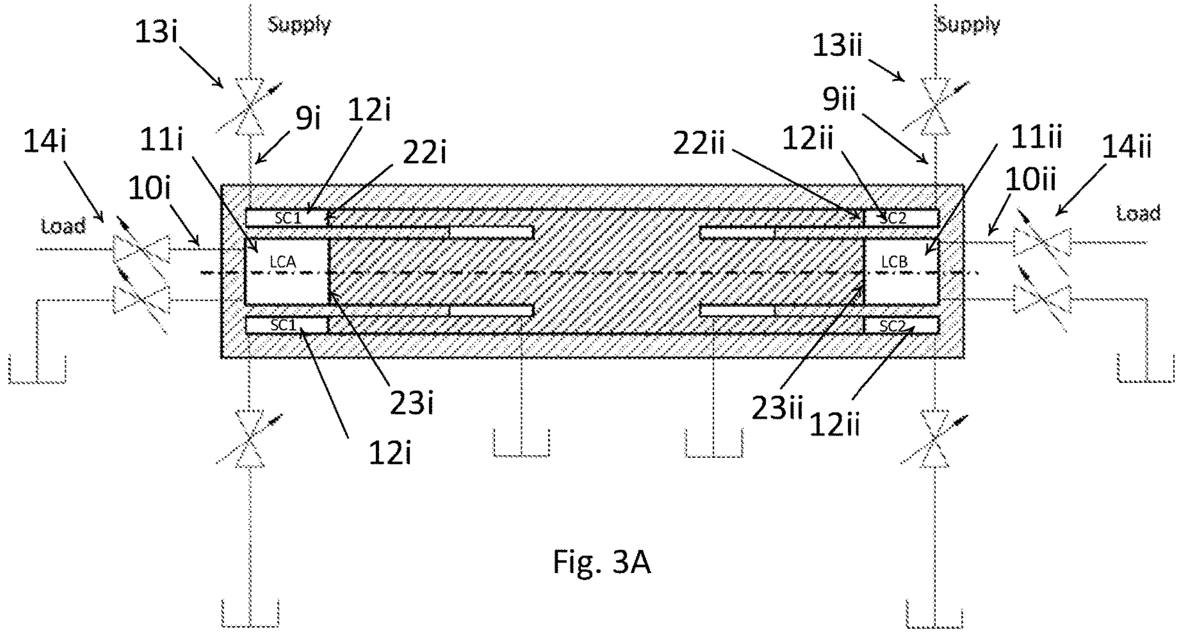
FIGS. 3A-B schematically illustrate a third embodiment according to the invention.
Figure 3B:
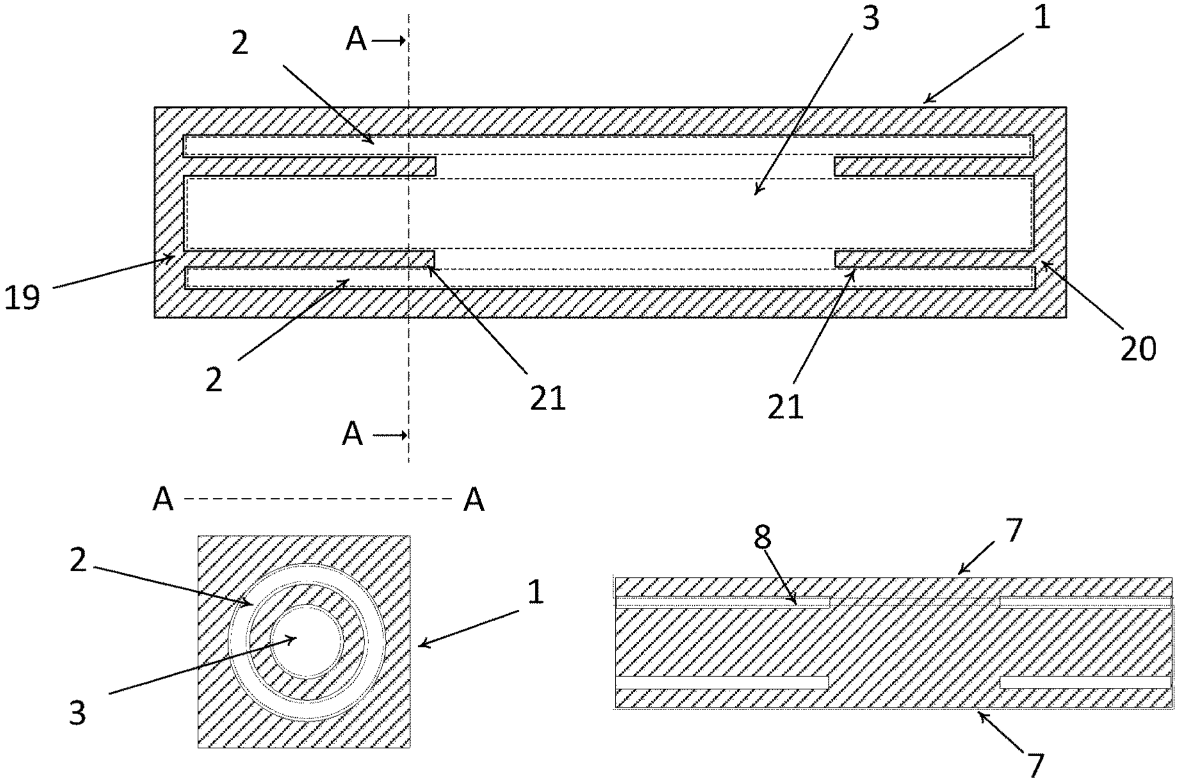

FIG. 3 shows another embodiment of a hydraulic transformer. Also for this embodiments, FIG. 3B has been drawn without the fluid passages for clarity reasons only.

For embodiments as the one shown in FIG. 3, the first cavity 2 is in the form of a cylindrical shell and the second cavity 3 is in the form of a cylinder where the cylindrical shell and the cylinder are co-axially provided in the housing. As illustrated, the two cavities 2, 3 are delimited over two lengths of the cavities by protruding elements.

The piston structure 16 is illustrated in FIG. 3B lower right corner and is a cylindrical element comprising a cut-out 8 at both end, said cut-outs are both formed as a cylindrical shell extending in a longitudinal direction of the piston structure 16 towards a mid-section of the piston structure 16. As illustrated in FIG. 2B the first piston 7 is thereby provided as a cylindrical shell and the second piston 8 as a cylinder, where the cylindrical shell and the cylinder are connected with each other at a mid-section.

The housing 1 comprising a first interior end 19 and a second interior end 20 from both of which a protrusion 21 extend. Each of the protrusions are adapted to fit, preferably snugly within one of said cut-outs 8 in the piston structure 16 so as to allow the piston structure 16 to reciprocate by the protrusions moving in and out of the cut-outs during the longitudinal motion of the piston structure 16. By the co-operation between the protrusion 21 and the cut-outs 8, the two chambers 11*i*, 11*ii* of the first cavity 2 are provided as a cylindrical shells and the two chambers 12*i*, 12*ii* of the second cavity 3 as cylinders.

Figure 5:
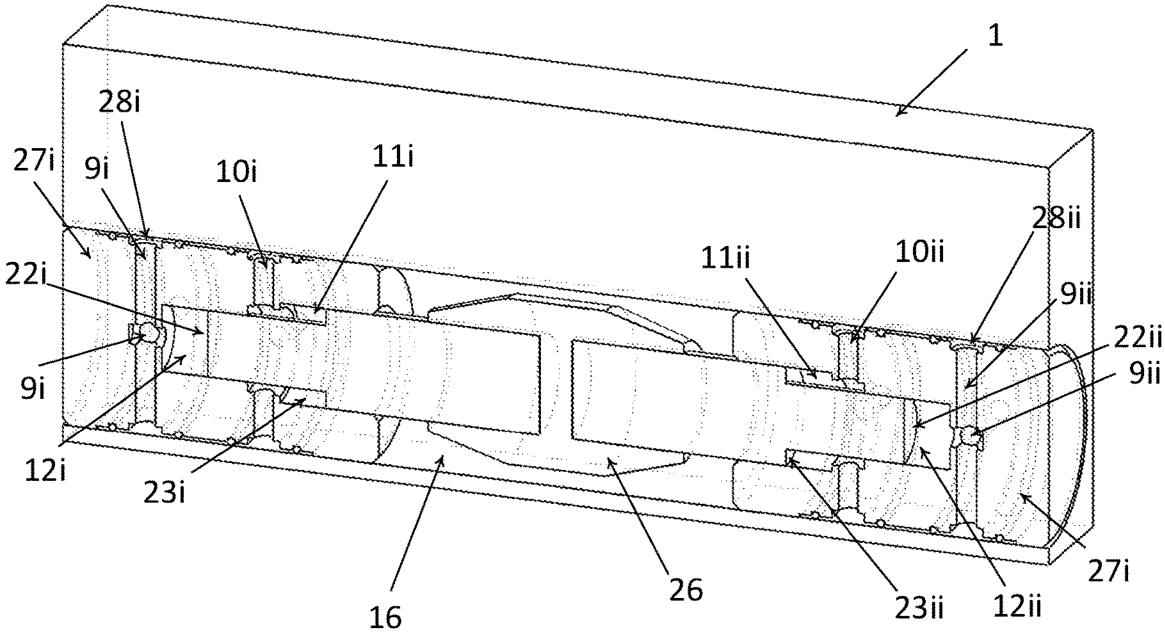
FIG. 5 schematically illustrates in a cross sectional view a fifth embodiment according to the invention.

FIG. 5 illustrates a fifth embodiments of a hydraulic transformer according to the invention. The embodiment is illustrated as a cross sectional view. The embodiment has some similarities to the embodiment disclosed in FIG. 2 and reference numbers from FIG. 2 has been adopted to the description of the embodiment of FIG. 5. As can be seen from FIG. 5, the piston structure 16 comprising two elements one element providing the piston heads 12*i*, 23*i* and another element providing the piston heads 12*ii*, 23*ii*. The two elements are assembled by use of an weight structure 26. However, the piston structure may be a monolithic body or the two elements of the piston structure may be a monolithic body and the weight structure 26 arranged on the piston structure, in which case the structure 26 are split-table to allow it to be placed on the piston structure. The weight structure comprising two opposing openings each configured to receive an element of the piston structure providing piston heads. As illustrated, the weight structure has been provided with a substantial volume which provides mass to the piston structure. By this, the kinetics of the piston structure can be altered by changing the mass (volume) of the weight structure 26.

The cavities which are divided by the piston heads into chambers are provided in cylinder elements which are placed inside the housing 1. Although not clearly visible in FIG. 5, the fluid passages 9*i*, 10*i*, 9*ii* and 10*ii* all connect to the outside of the housing. Kindly observe, that in the embodiment shown, the fluid passages 9*i* and 9*ii* each is provided by cross-bores which leads to a fluid distribution passages 28*i*, 28*ii*. These fluid distribution passages 28*i* and 28*ii* are connected to a passage leading to the exterior of the device. A similar arrangement is made to passages 10*i* and 10*ii* as illustrated.

While the above description of different embodiments has been focussed towards the mechanical elements, the invention also relates to a method of operating a hydraulic transformer according to the invention.

Such a method may be disclosed as comprising:

exchanging fluid between the exterior of the housing and the two chambers of the first cavity to provide a pressure configuration inside said two chambers to drive the piston structure 16 in one of the reciprocating directions or to maintain the piston structure 16 is a substantially fixed position.

LIST OF REFERENCE SYMBOLS USED

1 Housing
2 First tubular cavity
3 Second tubular cavity
4 Common axis
5 Tubular passage
6 Rod
7 First piston
8 Second piston
9*i*, 9*ii* Fluid passage
10*i*, 10*ii* Fluid passage
11*i*, 1*ii* Chamber
12*i*, 12*ii* Chamber
13*i*, 13*ii* Shut-off valves
14*i*, 14*ii* Shut-off valves
15 Processor
16 Piston structure
17 First cylindrical section
18 Second cylindrical section
19 First interior end
20 Second interior end
21 Protrusion
22*i*, 22*ii* Piston head of first piston
23*i*, 23*ii* Piston head of second piston
24 Hydraulic fluid reservoir
25*i*, 25*ii* Voids
26 Weight structure
27*i*, 27*ii* Cylinder elements
28*i*, 28*ii* Fluid distribution passages
29 Reservoir
40 Position sensor

The invention claimed is:

1. A hydraulic device comprising
a housing;
a first tubular cavity and a second tubular cavity provided within the housing;
a reciprocatable arranged piston structure, the piston structure comprising a first piston and a second piston; wherein
the first piston divides the first cavity into two chambers, and
the second piston divides the second cavity into two chambers;
fluid passages for individually exchanging fluid between an exterior of the housing and the chambers of the first and the second cavities, where each fluid passage comprising a controllable shut-off valve, so as to provide a reciprocating movement of the piston structure by exchanging fluid between exterior and the two chambers of the first cavity,
the hydraulic device being configured to control the shut-off valves to selectively be in a closed state or in an open state
and
wherein the hydraulic transform further comprising pressure sensors, wherein said pressure sensors are configured to determining a pressure in the two chambers of the first cavity and the two chambers of the second cavity and wherein the determined pressures are used to control a state of the controllable shut-off valves.

2. A hydraulic device according to claim 1, wherein at least a part of piston structure (16) provides a fluidic seal between the first and the second cavities.

3. A hydraulic device according to claim 1, wherein the first piston and the second piston each comprising two piston heads facing in opposite directions and into one of the chambers.

4. A hydraulic device according to claim 3, wherein the areas of the piston heads of the first piston are equal and/or the areas of the piston heads of the second piston are equal.

5. A hydraulic device according to claim 3, wherein the areas of the piston heads of the first piston are different from each other and/or the areas of the piston heads of the second piston are different from each other.

6. A hydraulic device according to claim 1, wherein those of the fluid passages exchanging fluid with the chambers of the first cavity is connectable to source of pressurized hydraulic fluid and those of the fluid passages exchanging fluid with the chambers of the second cavity is connectable to a hydraulic operated system.

7. A hydraulic device according to claim 1, wherein those of the fluid connections passages exchanging fluid with the chambers of the second cavity is connectable to source of pressurized hydraulic fluid and those of the fluid passages exchanging fluid with the chambers of the first cavity is connectable to a hydraulic operated system.

8. A hydraulic device according to claim 1, wherein each of the chambers is fluidic connectable to a hydraulic fluid reservoir.

9. A hydraulic device according to claim 1, wherein the controllable shut-off valves of the fluid passages for the chambers of the first cavity comprises two two way valves-, being selectively connectable to a source of pressurize hydraulic fluid and to a hydraulic fluid reservoir and being selectively shut-off.

10. A hydraulic device according to claim 1, wherein the controllable shut-off valves of the fluid passages for the chambers of the second cavity each comprising a set of two way valves with one of the two way valves being selectively connectable to hydraulic operated system and being selectively shut-off and the other of the two way valves being selectively connectable to a hydraulic fluid reservoir and being selectively shut-off.

11. A hydraulic device according to claim 1, wherein the hydraulic device further comprising a position sensor and a controller, wherein the position sensor is configured to determining an actual position of the piston structure relatively to the housing during the reciprocating movement and provide the actual position to the controller, and the controller is configured to control a state of valves in response to the actual position provided.

12. A hydraulic device according to claim 1, wherein the determined pressures are used, preferably together with a position determination of the piston structure to control the state of the controllable shut-off valves.

13. A hydraulic device according to claim 1, wherein one or more of the controllable shut-off valves are mechanically actuated and the hydraulic device further comprising a camshaft with lobes connected to the shut-off valves so that a rotation of the camshaft actuates the valves.

14. A hydraulic device according to claim 1, wherein the hydraulic transformed comprising a processor being configured to control the shut-off valves to selectively be in a closed state or in an open state.

15. A hydraulic device according to claim 1, wherein, the first tubular cavity and the second tubular cavity are provided within the housing side-by-side on a common axis, a tubular passage extending between the first tubular cavity and the second tubular cavity, the tubular passage being provided on the common axis;

wherein the piston structure comprising a rod being translatory moveable in a longitudinal direction of the rod and having a radius or equivalent radius being smaller than the radii or equivalent radii of the first and second tubular cavities and extending inside the cavities and through the tubular passage, wherein a fluidic seal is provided between the rod and the tubular passage to prevent fluid from being exchanged between first and the second tubular passages, a first piston provided on the rod in a position where the first piston is within the first cavity and divides the first cavity into the two chambers, and a second piston provided on the rod in a position where the second piston is within the second cavity and divides the second cavity into the two chambers.

16. A hydraulic device according to claim 15, wherein the rod besides extending in between the first and the second pistons furthermore extends beyond the first and the second piston and into a voids, wherein one void arranged at each end of the housing (1) and each of the void is either fluidic connected to the exterior or to a hydraulic fluid reservoir to avoid pressurization of fluid contained in the void.

17. A hydraulic device according to claim 1, wherein:

the first cavity has a first diameter and the second cavity has a second diameter being smaller than the first diameter, and wherein the first and the second cavities are co-axially provided within the housing, and the piston structure comprising a first piston as first cylindrical section and second piston as two second cylindrical sections co-axially provided on either end of the first cylindrical section, so as to provide two ring shaped piston heads of the first piston and two circular shaped piston heads of the second piston, wherein the first cylindrical section is adapted to fit snugly, within the first cavity and the two second cylindrical sections are adapted to fit snugly within the second cavity.

18. A hydraulic device according to claim 1, wherein, the first cavity is in the form of a cylindrical shell and the second cavity is in the form of a cylinder, the cylindrical shell and the cylinder are co-axially provided in the housing;

the piston structure is a cylindrical element comprising a cut-out at both ends, the cut-outs are both formed as a cylindrical shell extending in a longitudinal direction of the piston structure towards a mid-section of the piston structure, thereby providing the first piston as a cylindrical shell and the second piston as a cylinder;

the housing comprising a first interior end and a second interior end from both of which a protrusion extend each of which adapted to fit snugly within one of the cut-outs in the piston structure so as to allow the piston structure to reciprocate by the protrusions moving in and out of the cut-outs, provide the two chambers of the first cavity as a cylindrical shells and the two chambers of the second cavity as cylinders.

19. A method of operating the hydraulic device according claim 1, the method comprising exchanging fluid between the exterior of the housing and the two chambers of the first cavity to provide a pressure configuration inside the two chambers of the first cavity to drive the piston structure in one of two reciprocating directions or to maintain the piston structure in a fixed position.

* * * * *